Patented Dec. 11, 1934

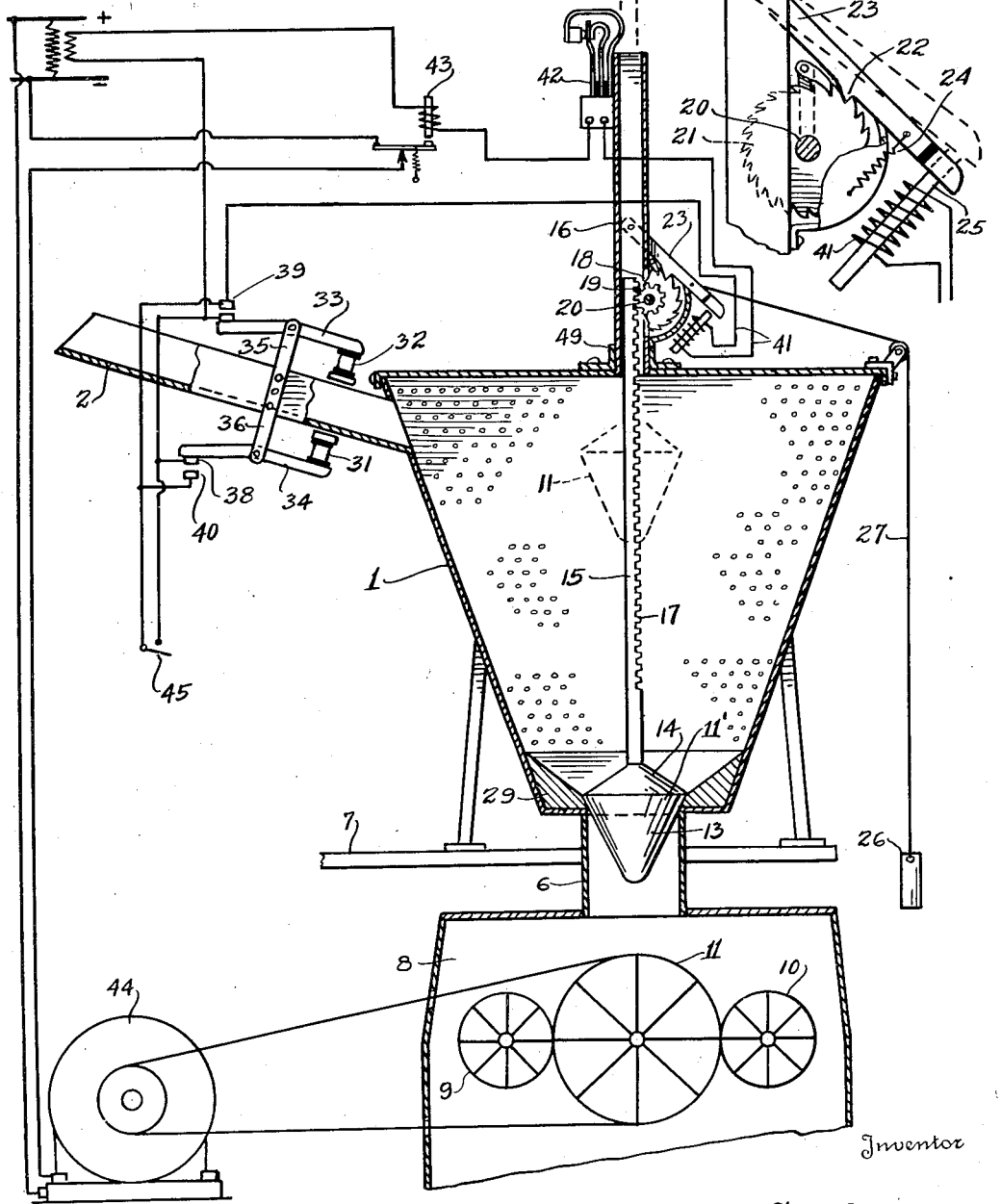

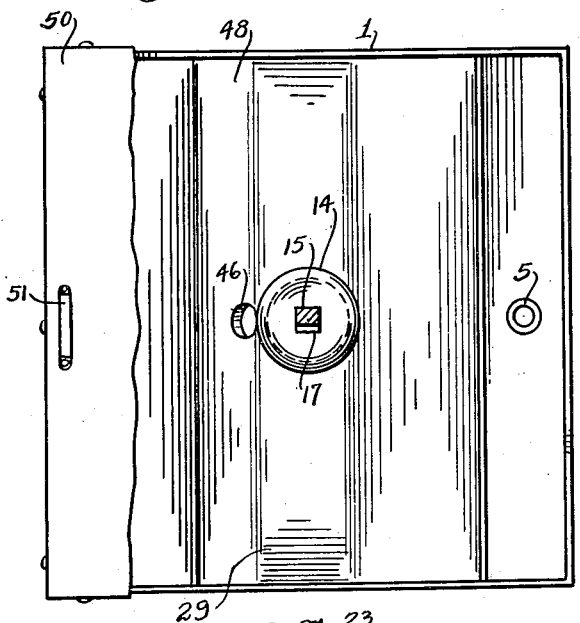
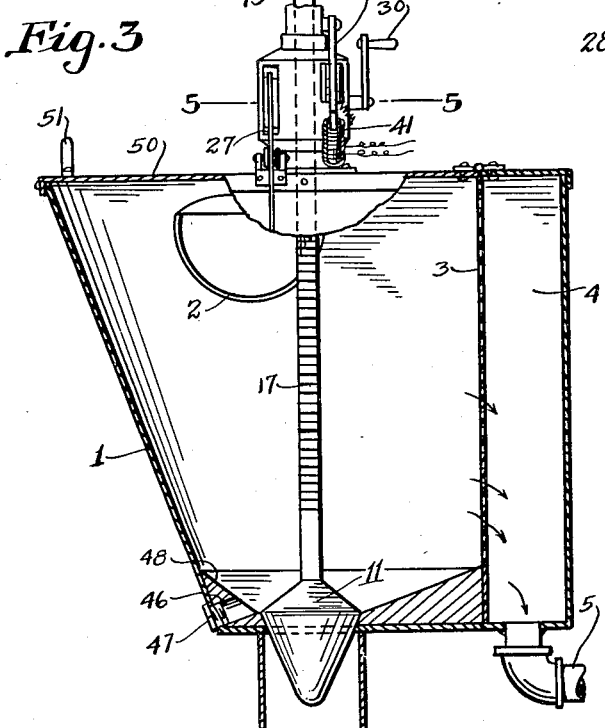
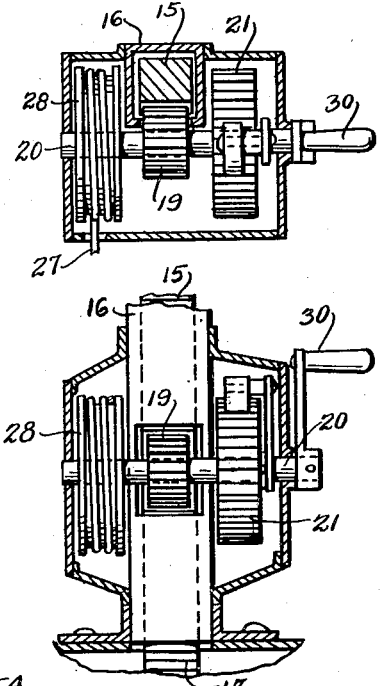

1,984,106

UNITED STATES PATENT OFFICE 1,984,106

PROTECTIVE TRAP FOR ENTRAIL HASHERS

William G. Aust, Milwaukee, Wis.

Application April 4, 1933, Serial No. 664,417

11 Claims. (Cl. 192—125)

This invention relates to an automatic protective trap for controlling the feed of entrails or like masses to comminuting machines, such as hashers.

One of the objects of the invention is to provide a trap which can be closed to cut off the flow of entrails to the hasher should the latter become obstructed by the wedging of a piece of bone or like obstruction between the cutting elements of the hasher.

Another object of the invention relates to automatic means responsive to pieces of iron, etc., which may be in the entrails, for stopping the flow of entrails through the trap to the hasher before the obstruction reaches the hasher, approximately locating the disturbing body, and optionally, sounding an alarm and stopping the hasher while the foreign body is removed.

A further object of the invention resides in the novel construction and arrangement of the trap and its appurtenant parts.

Other objects of the invention will appear as the following description of a preferred and practical embodiment thereof proceeds.

In the drawings which accompany and form a part of the following specification and throughout the several figures of which, the same characters of reference have been employed to designate identical parts:

Figure 1 is an assemblage view showing the trap in section and below it, diagrammatically, the hasher, the automatic features and the electrical connections associated with the same being more or less diagrammatically indicated;

Figure 2 is a top plan view partly in section;

Figure 3 is a side sectional view;

Figure 4 is a detail of the plunger release mechanism;

Figure 5 is a section taken along the line 5—5 of Figure 3; and

Figure 6 is a vertical section of the plunger elevating and release mechanism taken in a plane at right angles to that of Figure 3.

Before adverting in detail to the several figures of the drawings, it may be stated that in a butchering plant, it is customary to have chutes leading from the several points on the killing floor at which the killing is done, to a hopper, the entrails being fed by way of said chutes to the hopper, and delivered by a suitable conduit to a comminuting machine on the floor below, where the entrails are cut into small pieces and tanked preparatory to a conversion into one of the several by-products of the abattoir.

In the drawings, the numeral 1 represents such a hopper into which the chute 2 discharges, this chute being exemplary of a plurality of such chutes which may discharge into the hopper from various points on the killing floor. The hopper is of novel structure and comprises preferably a receptacle having the front and side walls converging toward the bottom and having a rear perforated vertical wall 3 placing the hopper in communication with an overflow chamber 4 leading to a drain 5.

The hopper is suitably supported and from its bottom extends a conduit 6 which preferably passes through the floor 7 and discharges into a hasher chamber 8 upon suitable hasher drums not shown, but being indicated as driven from gears 9, 10 and 11. Entrails are flushed down the chute 2 with a sufficient amount of water, and in the hopper, the surplus water escapes through the perforated wall 3, while the entrails deprived of most of their liquid vehicle pass through the conduit 6 onto the drums of the hasher which are provided with comminuting knives, not shown, since the hasher per se forms no part of the invention. Normally, the conduit 6 affords unrestricted exit for the entrails, but said conduit is controlled by a massive valve 12 having double convex or conical surfaces 13 and 14. Said valve is carried rigidly by a plunger 15, which plunger passes upwardly through a guiding tube 16 fixed to the top of the hopper. The plunger 15 is formed on one side as a rack having the teeth 17, and the side of the guiding tube 16 adjacent said rack is formed with an opening 18 through which projects a gear 19 in mesh with said rack. Said gear is fixed to a shaft 20 mounted in suitable bearings on the guiding tube 16, and on said shaft is also mounted a ratchet wheel 21, the teeth of which are engaged by a pawl 22 on a lever 23.

The pawl 22 is drawn down toward the ratchet wheel by a light spring 24 fixed at one end and at the other attached to the lever 23. Normally, the pawl 22 prevents rotation of the gear 19 in a direction to permit the descent of the plunger 15, and consequently the valve 11 is normally held in the inoperative position indicated in broken lines in Figure 1. The lever 23 is raised by the armature 25 of a solenoid, so as to trip the pawl 22 and release the ratchet wheel 21, permitting the descent of the valve 11 by gravity. In the absence of the solenoid, the pawl may be released by lifting the lever 23 manually or by any suitable mechanical means. Part of the weight of said valve is counter-balanced by a weight 26 suspended by a cable 27 windable about a drum 28, see Figures 5 and 6, fixed to the shaft 20. The provision of the weight 26 is not an essential part of the invention and any equivalent means may be provided without transcending the scope of the invention.

The unbalanced weight of the valve 11 and the shape of its lower surface is such as to permit it to dive through the mass of entrails, when released, so as to reach its seat, the latter being constituted in the present exemplary embodiment of the invention by a cast ring member 29, positioned in the bottom of the hopper. The valve is raised manually by means of a crank 30 on the end of the shaft 20, but if desired, automatic elevating means, not shown, may be provided.

In its elemental adaptation, that is to say, divested of all its automatic features, the trap of the present invention is exceedingly valuable in cutting off the flow of intestines to the hasher when for any reason the latter has ceased operating. For instance, should a bone or other obstruction have jambed the rotating drums of the hasher and brought them to a standstill, the hopper in the absence of the valve 11 would deluge the stalled machine with a mass of entrails which would render the extrication of the hasher from this excess load of material exceedingly difficult and unpleasant. By the present invention, the instant the hasher jambs, it is necessary for the attendant merely to lift the lever 23 whereupon the valve 11 will quickly gravitate to its seat, cutting off further flow into the hasher.

The upper convex or conical surface 14 of the hasher is designed to prevent the valve catching in loops of entrails and preventing them from being fed through the hopper. With the present construction, there is no place on the top surface of the valve for the lodgment of the entrails, but they will slide off from the convex upper surface 14 of the valve maintaining the latter at all times clear.

It frequently happens that the butchered animals, and in particular, hogs, have in the course of their lifetime, swallowed nails, nuts and other bits of iron, which remain in the entrails, and on account of the ordinary impossibility of their detection, work mischief if they reach the hasher, not only stalling the machine, but frequently chipping or breaking the comminuting knives. The usefulness of the trap is therefore greatly enhanced by the automatic features, as shown, by means of which iron or other magnetic articles in the entrails are detected before they enter the hopper, the machinery stopped to give opportunity for their removal, the trap closed to prevent the contents thereof flooding the stopped machine, and an alarm sounded to call the attention of the attendant and to avoid delay in the restoring of the machine to its operating status.

The automatic iron detector comprises one or more magnets, two of which are shown in the exemplary embodiment and being indicated at 31 and 32. These magnets are arranged in proximity to the chute, the magnet 31 being close to the bottom of the chute and the magnet 32 overlying the top or open side thereof. Since the influence of a magnet does not extend very far from its pole, two magnets are recommended where the depth of the chute is considerable, while if the chute is very shallow, one magnet will suffice. Each of the magnets is secured to one end of normally balanced levers 33 and 34, said levers being suitably pivoted to uprights 35 and 36. The opposite ends of said levers are provided with switch contacts 37 and 38. When an entrail having an iron body in its interior passes the zone of the magnets 31 and 32, one or the other or both of said magnets are attracted to the iron, unbalancing the levers 33 or 34 or both, tilting them until the switch contacts 37 or 38 or both engage the complementary contacts 39 and/or 40.

The closing of the normal gap between either of these pairs of contacts closes a circuit through the solenoid 41 having the armature 25, which throws out said armature raising the lever 23 to the broken line position shown in Figure 1, and releasing the pawl 22. Immediately the valve 11 descends as has been described, interrupting the flow of intestines from the hopper.

A bell or buzzer 42 of any desired construction may be in series with the solenoid 41 so as to be energized simultaneously with said solenoid and to give an alarm to the attendant, that the feed of entrails to the hasher has been interrupted. The attendant knows at once, that the source of the trouble is in the zone of the magnets and by feeling among the entrails at this point, he discovers the nut, nail or other magnetic body which can be readily cut out.

Although it is not absolutely essential that the hasher should be stopped while the supply of entrails remain cut off, yet in the interest of conservation of power this is desirable. Consequently, the circuit controlled by the magnets 31 and 32 may also include a relay 43 for breaking the circuit of the motor 44. A switch 45 may also be provided for releasing the valve 11 and stopping the operation of the hasher, at will.

Figure 3 shows that the hopper 1 is provided at its lowermost level with an outlet opening 46 closed by a plug 47. This is useful in washing out the hopper, at which time, the valve 11 should be closed as shown in Figure 3, preventing the wash water going through the conduit 6 and flooding the hasher. The convex upper face of the valve forms with the inclined walls 48 of the cast member 29, an annular trough or channel facilitating the washing of the bottom of the hopper and assuring the drainage away of all of the waste water.

The guiding tube 16 may be supported in any suitable manner as by the angle irons 49 which extend across the top of the hopper. A cover 50 may be provided, hinged to the angle irons as shown, and having a suitable handle 51.

While I have in the above disclosure described what I believe to be a preferred and practical embodiment of my invention, it is to be understood that numerous modifications may be made in the specific structure of the several parts, and that the invention is not limited to the specific expedients as shown for rendering its functioning automatic, but that it contemplates the substitution of equivalents insofar as permitted by the language and intent of the appended claims.

What I claim is:

1. Hasher trap for entrails comprising a hopper having a discharge port in its bottom and a gravity seated valve for closing said discharge port, a plunger rod to which said valve is affixed, releasable means for detaining said plunger rod normally in valve-open position and means responsive to the presence of iron in the entrails at a point anterior to said valve for releasing said plunger detaining means.

2. Hasher trap for entrails comprising a hopper having a discharge port in its bottom the walls of the hopper converging to said port and a gravity seated valve for closing said discharge port, said valve having its lower portion converging substantially to a point, and being of sufficient weight to burrow by gravity through the mass of entrails in said hopper, in finding its seat a plunger rod to which said valve is affixed, and releasable means for detaining said plunger rod with the valve elevated in the hopper and the discharge port unobstructed.

3. Hasher trap for entrails comprising a hopper having a discharge port in its bottom, a gravity seated valve for closing said discharge port, said valve having its upper and lower surface reversely convexed, a plunger rod to which said valve is affixed, releasable means for detaining said plunger rod normally in valve-open position and means responsive to the presence of iron in the entrails at a point anterior to said valve for releasing said plunger detaining means.

4. Hasher trap for entrails comprising a hopper including an entrail receiving chamber, and a drain chamber with a perforated partition therebetween, a chute feeding into said entrail chamber, and a discharge conduit communicating with the bottom thereof, a gravity closing valve controlling said conduit, means for normally maintaining said valve in open position and means at said chute responsive to the presence of iron in the entrails at a point anterior to said valve for releasing said plunger detaining means.

5. Hasher trap for entrails comprising a hopper, means for feeding entrails thereto, said hopper having a discharge port in its bottom, a valve for closing said discharge port, a plunger rod to which said valve is affixed, releasable means for normally detaining said plunger rod in valve-open position, and means adjacent said feed means responsive to magnetic material in said entrails for actuating said releasable means for releasing said plunger rod.

6. Hasher trap for entrails comprising a hopper, a chute for feeding entrails thereto, said hopper having a discharge port in its bottom and a valve for closing said discharge port, a plunger rod to which said plunger rod is affixed, releasable means for normally detaining said plunger rod in valve-open position, an electrically operated element for actuating said releasable means, and a magnetic switch in circuit with said element, said switch being responsive to the presence of magnetic material in said entrails in said feeding means.

7. Hasher trap for entrails comprising a hopper including an entrail receiving chamber and a drain chamber with a perforated partition therebetween, a chute for feeding entrails into said entrail chamber, a discharge conduit communicating with the bottom of said chamber, a gravity closed valve controlling said conduit, releasable means for normally holding said valve in open position, and means adjacent said chute responsive to the presence of magnetic material in said entrails for actuating said releasable means.

8. In combination, a hasher, a motor for driving said hasher, a trap associated with said hasher including an entrail receiving chamber, a conduit for discharging entrails from said chamber to said hasher and a valve in said trap for closing said conduit, releasable means for normally holding said valve in valve-open position, a chute for feeding entrails into said trap, an electric element for actuating said releasable means, and a magnetic switch adjacent said chute in circuit with said electric element and with a circuit breaking element with said motor circuit, said switch being responsive to the presence of magnetic matter in said entrails in said chute for automatically closing said valve, thereby cutting off the feed of entrails to said hasher and simultaneously stopping the operation of said hasher.

9. Hasher trap for entrails comprising a hopper having a discharge port in its bottom and a gravity seated valve for closing said discharge port, a plunger rod to which said valve is affixed, said plunger rod being constructed as a rack, a ratchet wheel meshing with said rack for elevating said plunger rod to open said valve, a pawl normally detaining said ratchet wheel in any attained position of elevation, electric means for releasing said pawl, means for feeding entrails into said hopper, a magnetic switch adjacent said means and in circuit with said electric means, said magnetic switch being responsive to said magnetic bodies in the entrails passing said magnetic switch within said trough, for releasing said valve upon the magnetic detection of such bodies.

10. Hasher trap for entrails comprising a hopper including an entrail receiving chamber and a drain chamber with a perforated partition therebetween, a chute feeding into said entrail chamber, and a discharge conduit communicating with the bottom of said entrail chamber, an annular member within said hopper surrounding the upper end of said conduit and forming a valve seat, a gravity closed valve engageable with said seat, and means for normally maintaining said valve in elevated position comprising a plunger rod for said valve, a rack on said plunger rod, a ratchet engaging said rack, means for winding said ratchet to elevate said plunger rod, a pawl for releasably detaining said ratchet at any elevated position of said valve, and means for releasing said pawl to permit gravital descent of said valve to its seat.

11. Hasher as claimed in claim 10, said valve having reversely convexed upper and lower surfaces.

WILLIAM G. AUST.